Figure 1:
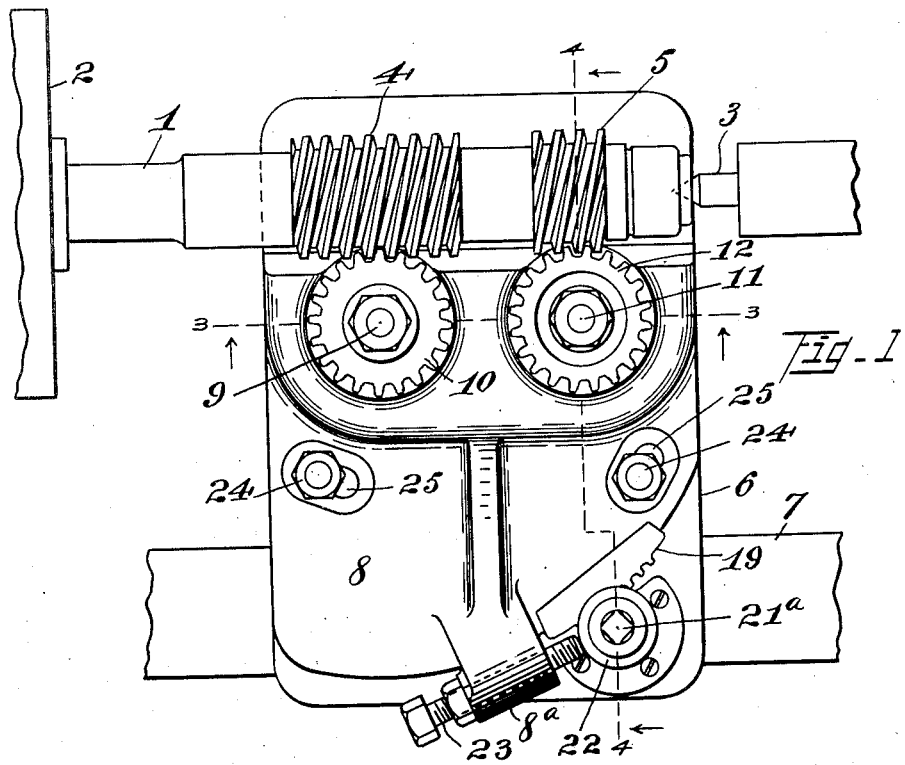

J. P. JOHNSON.
GEAR AND SCREW CUTTING MECHANISM.
APPLICATION FILED MAR. 9, 1920.

1,406,985.

Patented Feb. 21, 1922.
2 SHEETS—SHEET 1.

Inventor
JAMES P. JOHNSON
By Louis F. Griswold.
Atty.

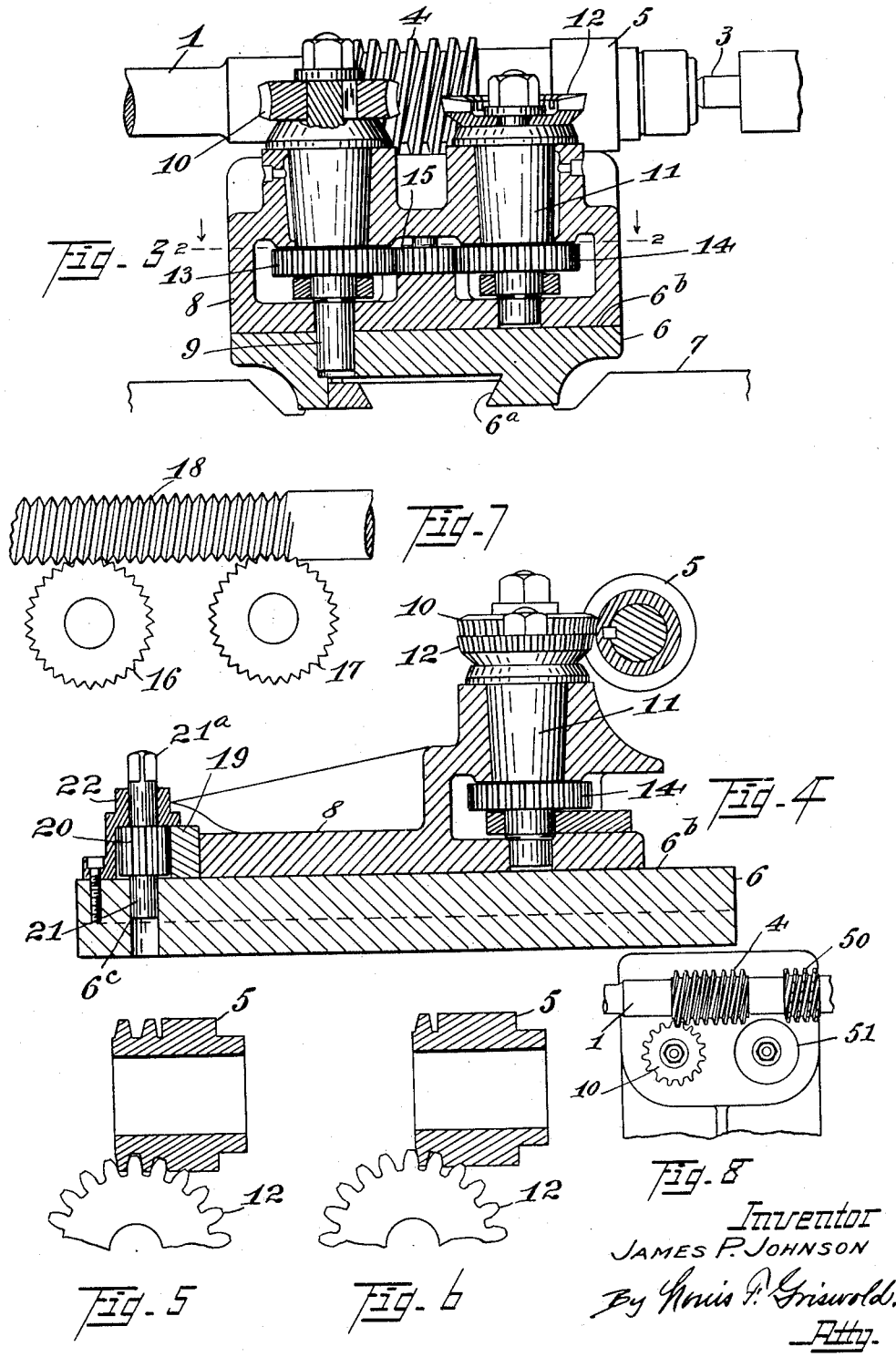

UNITED STATES PATENT OFFICE.

JAMES P. JOHNSON, OF CLEVELAND HEIGHTS, OHIO.

GEAR AND SCREW CUTTING MECHANISM.

1,406,985. Specification of Letters Patent. Patented Feb. 21, 1922.

Application filed March 9, 1920. Serial No. 364,411.

*To all whom it may concern:*

Be it known that I, JAMES P. JOHNSON, a citizen of the United States, residing at Cleveland Heights, in the county of Cuyahoga and State of Ohio, have invented certain new and useful Improvements in Gear and Screw Cutting Mechanism, of which the following is a specification.

This invention relates to improvements in mechanism for cutting gears or screws, and it has particular reference to the cutting of worm gears, spiral or helical gears, and to screw threading. Heretofore worm and spiral gears have been made by the employment of gear shaping machines especially designed for each particular class of work. These machines are more or less complicated in construction and therefore expensive to produce.

The object of the present invention is to greatly economize in the manufacture of gears of the character set forth, by the production of mechanism that is adapted to attachment to an ordinary lathe or similar auxiliary machine, and cooperate therewith for expeditiously and accurately cutting worms with unitary or multiplex thread; cutting spiral or helical gears, or for cutting screws with single or multiplex threads.

The improvement further provides for the cutting of worm wheels with the same mechanism, operated in the same general manner, necessitating only a transposition of cutting members and the blanks to be operated upon.

A further object of the invention is to produce mechanism of this class, that is simple and reliable in construction; that can be readily attached to the coacting auxiliary machine, and that can be easily changed in its adaptability for different sizes or classes of work.

With these and other apparent objects in view, the invention consists in certain novel features of construction and combination and arrangement of parts as hereinafter set forth and pointed out definitely in the claims, reference being had to the accompanying drawings which are made part of the specification, similar reference characters being employed to designate corresponding parts.

Figure 2:
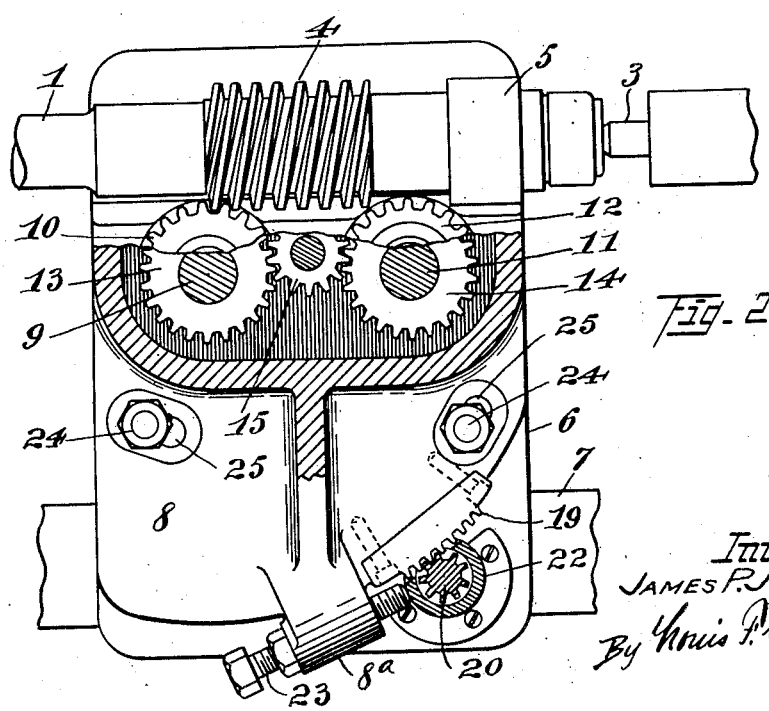

In the said drawings Figure 1 is a plan view of the improved device. Fig. 2 is a plan view, partially in section on line 2—2 of Fig. 3, and showing the device in a different position relatively to the work, from that shown in Fig. 1. Fig. 3 is a vertical section on line 3—3 of Fig. 1. Fig. 4 is a section on line 4—4 of Fig. 1. Figs. 5 and 6 are fragmentary illustrations of certain stages of the operation of cutting a worm. Fig. 7 illustrates the application of the device in screw cutting. Fig. 8 illustrates the device as employed for cutting worm wheels.

In the embodiment of the invention as illustrated (Figs. 7 and 8 being excepted) the machine is arranged for cutting worm gears, and with this end in view, a mandril 1 is adapted to be connected with a lathe in the ordinary manner, operative between the driven head 2 and the tail stock center 3. The mandril 1 carries a generating or pattern worm 4 of the same size and pitch, or in other words, a fac-simile of the worm to be cut. The said mandril also carries the worm 5 to be cut, the blank of which is shown in Figs. 2 and 3, and the finished worm in Fig. 1.

6 represents a carriage bed plate, provided on its underside with a dove-tail groove $6^a$ adapted to engage the longitudinal carriage 7 of a lathe. The top $6^b$ of the plate 6 is a horizontal plane surface, as shown in Figs. 3 and 4. Mounted on the plate 6 is a housing 8, a vertical spindle 9 providing pivotal connection between said housing and the plate. The spindle 9 is journaled in the housing 8 and carries a worm gear 10 which meshes with the pattern worm 4. A second vertical spindle 11 is journaled in the housing 8 and carries a cutter tool 12, the teeth of which are of like contour to the teeth of the worm wheel 10. Spur gears 13 and 14 are fixed on the spindles 9 and 11, respectively, and cooperate through the medium of an idler gear 15.

The generating worm 4 and the blank 5 to be operated on, being fixed on the same mandril 1, are rotated at the same speed, and the worm 4 meshing with the worm wheel 10 drives the cutter 12 through the coaction of gears 13, 15 and 14, thereby causing the teeth of the cutter 12 to act on the blank 5 tangentially, and produce a worm of like character to the generating or pattern worm 4. This is the result of the worm-wheel 10 and cutter tool 12 have the same number of teeth, as in the present embodiment. The circumferential pitch ratio of the teeth of the wheel 10 and cutter 12 may, however, be multiplied or divided by an integer; so that a unitary thread worm may be generated with a multiplex thread generating worm, or vice-versa, according to the relative numbers of teeth on the said wheel and cutter, the revolutions of the latter members being identical.

It will be readily understood that the same mechanism can be employed for cutting worm-wheels, as shown in Fig. 8, by fixing a worm cutter hob 50 on the mandril 1 in place of the member 5, and substituting a wheel blank 15 for the cutter tool 12 on the spindle 11, and not changing the coacting generating elements 4 and 10, or changing the general operation of the mechanism.

Screws of any desired character may be cut with the improved mechanism, as illustrated in Fig. 7. A pattern screw is fixed on the mandril in the lathe, and a wheel 16, provided with teeth corresponding to the thread of the screw, is substituted for the generating element 10. A cutter wheel 17 takes the place of the cutter 12, and the operation is the same as that described in reference to worm cutting. When it is desired to cut a long thread, the generating wheel 16 can follow in the thread 18 which has been cut in advance.

Arcuate adjustment of the cutter 12 relatively to the mandril 1, without changing the relation of member 10, is provided by a segmental rack 19 having a pitch radius with the axis of the spindle 9 as a center. The rack 19 is in mesh with a spur pinion 20 fixed on a vertical spindle 21 which has a bearing in the base plate 6 at 6°, and in a collar 22 which is attached to said base plate. The top 21ª of the spindle 21 is squared to receive an actuating key, not shown. A screw 23 threaded in an extension 8ª of the member 8 and adapted to bear on the collar 22 provides an adjustable stop. Further adjustable stop means are provided by set screws 24 which are threaded into the base plate 6 and extend through arcuate slots 25 formed in the member 8. The slots 25 are described with radii having the axis of the spindle 9 as a center, and the heads of the screws 24 bearing on the top of member 8 lock said member 8 in its arcuate adjustment on member 6. This provides means whereby the article to be generated may be completed either in one cut or in several cuts across the blank, as may be required by the nature of the material operated upon and the dimensions of the grooves formed therein.

What I claim and desire to secure by Letters Patent is.

1. In mechanism for generating worms, worm-wheels, spiral gears, or screws, the combination of a lathe arbor, a generating pattern threaded member carried on said arbor, a driving spindle mounted in a movable frame provided, said spindle being disposed in right angle relation to the arbor, a driving gear on said spindle in mesh with the pattern member carried on the arbor, a second spindle mounted in the frame parallel with the driving spindle, a train of gears connecting the two spindles, a cutter tool conforming in configuration to the thread to be cut, said tool being carried by the arbor, or the last named spindle, depending on the type to be generated, and a blank to be operated on, carried by the arbor, or the last named spindle according to the mounting of the cutter tool which is fed to the blank through the coaction of the pattern, its companion gear, and the said train of gears.

2. In gear or screw cutting mechanism to be attached to and coact with a lathe, the combination of a mandril driven by the lathe, a generating thread and a blank to be operated on carried on said mandril, two coacting spindles mounted in suitable housing in right angle relation to the mandril, a gear cutting tool carried on one of said spindles, a feed gear carried by the other spindle and in mesh with the generating thread carried on the mandril, the teeth of the cutter being of like character to the teeth of the feed gear, and a train of gears, connecting said spindles and coacting with the feed gear and generating thread for feeding the cutter to the blank.

3. In gear or screw cutting mechanism to be attached to and coact with a lathe, the combination of a mandril driven by the lathe, a generating thread and a gear cutting tool carried on said mandril, the cutting tool being of like character to the generating thread, two coacting spindles mounted in suitable housing in right angle relation to the mandril, a blank carried on one of the spindles, a feed gear carried by the other spindle and in mesh with the generating thread on the mandril, and a train of gears, connecting said spindles and coacting with the feed gear and generating thread for feeding the blank to the cutter carried on the mandril.

4. In gear or screw cutting mechanism to be attached to and coact with an auxiliary machine, the combination of an arbor operated by the auxiliary machine, a bed plate adapted to be attached to the auxiliary machine, a frame mounted to oscillate horizontally on said bed plate on an axis disposed definitely at right angles to the arbor, means for oscillating said frame, means for governing the oscillation of said frame, a master worm and a blank to be operated on carried by the arbor, two coacting spindles mounted in said frame at right angles to the arbor, one of said spindles defining the axis of oscillation of the frame and carrying a master worm wheel in mesh with the master worm on the arbor, a cutter carried on the other spindle, said cutter provided with teeth of the same circumferential pitch as the master worm wheel or a multiple or division thereof, and a train of gears connecting said spindles so that they will rotate uniformly in the same direction and coacting with the master wheel and worm to feed the cutter to the blank to be cut.

5. In a lathe attachment for cutting worms, worm wheels, spiral gears, or screws, the combination of an arbor carrying a master worm and a cutter or interchangeable worm blank to accommodate the device to worm cutting or worm wheel cutting, respectively, a housing adapted to be attached to the lathe, two coacting spindles mounted in said housing disposed at right angles to the arbor, a master worm wheel carried by one of said spindles in mesh with the master worm, a cutter, or interchangeable blank carried by the other spindle to accommodate the device to worm cutting, or worm wheel cutting respectively, a train of gears connecting said spindles so that they rotate in the same direction and coacting with the master worm and master worm wheel to feed the cutter element to the blank to be cut, the cutter when carried by the spindle for cutting worms having teeth of the same character as the master worm wheel, and the cutter when carried by the arbor for cutting worm wheels being of the same type as the master worm.

In testimony whereof I affix my signature.

JAMES P. JOHNSON.